United States Patent [19]

Cannon

[11] Patent Number: 4,878,075
[45] Date of Patent: Oct. 31, 1989

[54] CAMERA APPARATUS FOR PREVENTING DOUBLE EXPOSURE

[75] Inventor: James W. Cannon, Penfield, N.Y.

[73] Assignee: Eastman Kodak Company, Rochester, N.Y.

[21] Appl. No.: 254,907

[22] Filed: Oct. 7, 1988

[51] Int. Cl.⁴ .......................... G03B 1/12; G03B 17/24
[52] U.S. Cl. .................................... 354/173.1; 354/106
[58] Field of Search ...................... 354/105, 106, 173.1, 354/173.11

[56] References Cited

U.S. PATENT DOCUMENTS

| | | | |
|---|---|---|---|
| 2,674,009 | 4/1954 | Williams | 18/59 |
| 3,999,842 | 12/1976 | Niederhauser et al. | 352/5 |
| 4,146,312 | 3/1979 | Amikura et al. | 352/27 |
| 4,198,136 | 4/1980 | Staudacher et al. | 352/169 |
| 4,340,286 | 7/1982 | Carr | 354/105 |

Primary Examiner—Michael L. Gellner
Attorney, Agent, or Firm—Roger A. Fields

[57] ABSTRACT

In a photographic camera, a motorized film transport is operated in a prewind mode to continuously advance successive unexposed frames of a filmstrip from a light-tight cassette to a film take-up, without exposing any of the film frames at the focal plane of an objective lens, and is operated in a rewind mode to position respective unexposed frames for exposure at the focal plane and to return them individually to the cassette following each exposure. Before an exposed frame is returned to the cassette, a double exposure prevention (DEP) encodement is applied to the filmstrip at a predetermined location proximate the exposed frame. If the filmstrip is rewound into the cassette prematurely, i.e. without it being completely exposed, and at a later time the cassette is re-loaded into the camera, the film transport will be operated in the pre-wind mode only until a DEP encodement is sensed. Then, the film transport will be operated in the rewind mode to return the exposed frame corresponding to the sensed encodement to the cassette and to position the next-available unexposed frame for exposure at the focal plane.

3 Claims, 11 Drawing Sheets

LOAD ROUTINE

MIDROLL INTERRUPT (MRI) ROUTINE

CAMERA APPARATUS FOR PREVENTING DOUBLE EXPOSURE

CROSS-REFERENCE TO RELATED APPLICATIONS

Reference is made to the following commonly assigned copending applications:

(1) Ser. No. 221,955, entitled MOTOR-DRIVEN FILM TRANSPORT APPARATUS, and filed July 20, 1988 in the name of Donald M. Harvey;

(2) Ser. No. 254,906, entitled CAMERA APPARATUS FOR MAGNETICALLY RECORDING ON FILM and filed Oct. 7, 1988 in the names of Conrad Diehl and Michael L. Wash;

(3) Ser. No. 206,646, entitled METHOD OF MODULATING A BINARY DATA STREAM, and filed June 14, 1988 in the name of Michael Lee Wash;

(4) Ser. No. 206,408, entitled THREE-PART ENCODER CIRCUIT, and filed June 14, 1988 in the names of Arthur Allan Whitfield and Michael Lee Wash;

(5) Ser. No. 206,553, entitled THREE-PART DECODER CIRCUIT, and filed June 14, 1988 in the name of Arthur Allan Whitfield; and (6) Ser. No. 206,407, entitled THREE-PART DECODER CIRCUIT, and filed June 14, 1988 in the name of Michael Lee Wash.

BACKGROUND OF THE INVENTION

1. Field of the Invention

The invention relates generally to the field of photography, and particularly to camera apparatus for preventing double exposure when a film cassette containing a partially or fully exposed filmstrip is loaded into the camera apparatus.

2. Description of the Prior Art

Generally speaking, commercially available 35 mm film cassettes such as manufactured by Eastman Kodak Co. and Fuji Photo Co., Ltd. comprise a hollow cylindrical shell having an integral throat or lipped portion which extends tangentially from the shell. A film spool on which the filmstrip is wound is freely rotatable within the cassette shell. The filmstrip has a leading section, commonly referred to as a "film leader", which protrudes from a light-trapped slit in the throat portion to the outside of the cassette shell. Typically, the protruding leader extends 2-3 inches in length.

In conventional 35 mm film cassettes, one end of the film spool on which the filmstrip is wound has a short axial extension which projects from the cassette shell, enabling the spool to be turned by hand. If the spool is manually rotated initially in an unwinding direction, the film convolutions inside the cassette shell will tend to expand radially since the inner end of the filmstrip is attached to the spool, and the film leader protruding from the slit will remain stationary. The film convolutions can expand radially until a non-slipping relation is established between the outermost convolution and the inner curved wall of the cassette shell. Once this non-slipping relation exists, there is a binding effect between the outermost convolution and the cassette shell which prevents further rotation of the spool in the unwinding direction. Thus, rotation of the spool in the unwinding direction cannot serve to advance the filmstrip out of the shell, and it is necessary in the typical 35 mm camera to engage the protruding leader to draw the filmstrip out of the shell.

A 35 mm film cassette has been proposed which, unlike conventional film cassettes, can be operated to automatically advance the filmstrip out of the cassette shell by rotation the film spool in the unwinding direction. Moreover, the film leader is non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to produce from between the circumferential lips and rest against the shell wall. During unwinding rotation of the film spool, the leading end of the filmstrip is advanced to and through a film passageway opening in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced to the outside of the cassette shell. In the patent, it is suggested that one manually rotate the film spool relative to the cassette shell until the film leader can be manually grasped and attached to a film advancing device in the camera. Thus, the camera is not used to rotate the film spool to advance the filmstrip from the cassette shell.

3. The Cross-Referenced Application

Like the type of film cassette disclosed in U.S. Pat. No. 4,423,923, cross-referenced application Ser. No. 221,995 discloses a film cassette that contain a filmstrip, including a non-protruding leader, which is automatically advanced to the outside of the cassette shell in response to rotation of the film spool in an unwinding direction. However, unlike the patent, the cross-referenced application discloses a camera having a motor-driven film transport (rather than manual means) for rotating the film spool to propel the filmstrip from the cassette shell.

SUMMARY OF THE INVENTION

The invention goes beyond the prior art and the cross-referenced application relating to the type of film cassette that contains a filmstrip which can be automatically advanced from the cassette shell when the film spool is rotated, by providing camera apparatus for preventing double exposure of the filmstrip. More particularly, when a film cassette containing a filmstrip which is partially exposed is initially used with the camera apparatus the next-available unexposed film frame is automatically positioned for exposure.

According to the invention, there is provided an improved camera wherein a motorized film transport is operated in a prewind mode to continuously advance successive unexposed frames of a filmstrip from a light-tight cassette across a focal plane of an objective lens to a film take-up, without exposing any of the film frames at the focal plane, and is operated in a rewind mode to position respective unexposed frames for exposure at the focal plane and to return them individually to the cassette following each exposure, and wherein the improvement comprises:

read/write means responsive to exposure of respective film frames at the focal plane for providing corresponding film encodements along the filmstrip to indicate each film frame is exposed, and for sensing the presence or absence of a film encodement for a film frame to determine whether that particular frame is exposed; and control means responsive to the read/write means sensing the absence of a film encodement for a film frame for allowing the film transport to continue to operate in the prewind mode, and responsive to the read/write means sensing the presence of a film encodement for a film frame for operating the film transport in the rewind mode to return only that particular frame to the cassette, whereby when a cassette containing a filmstrip which is partially exposed is loaded in the camera the control means will operate the film transport to position the next-available unexposed frame of the filmstrip for exposure at the focal plane.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
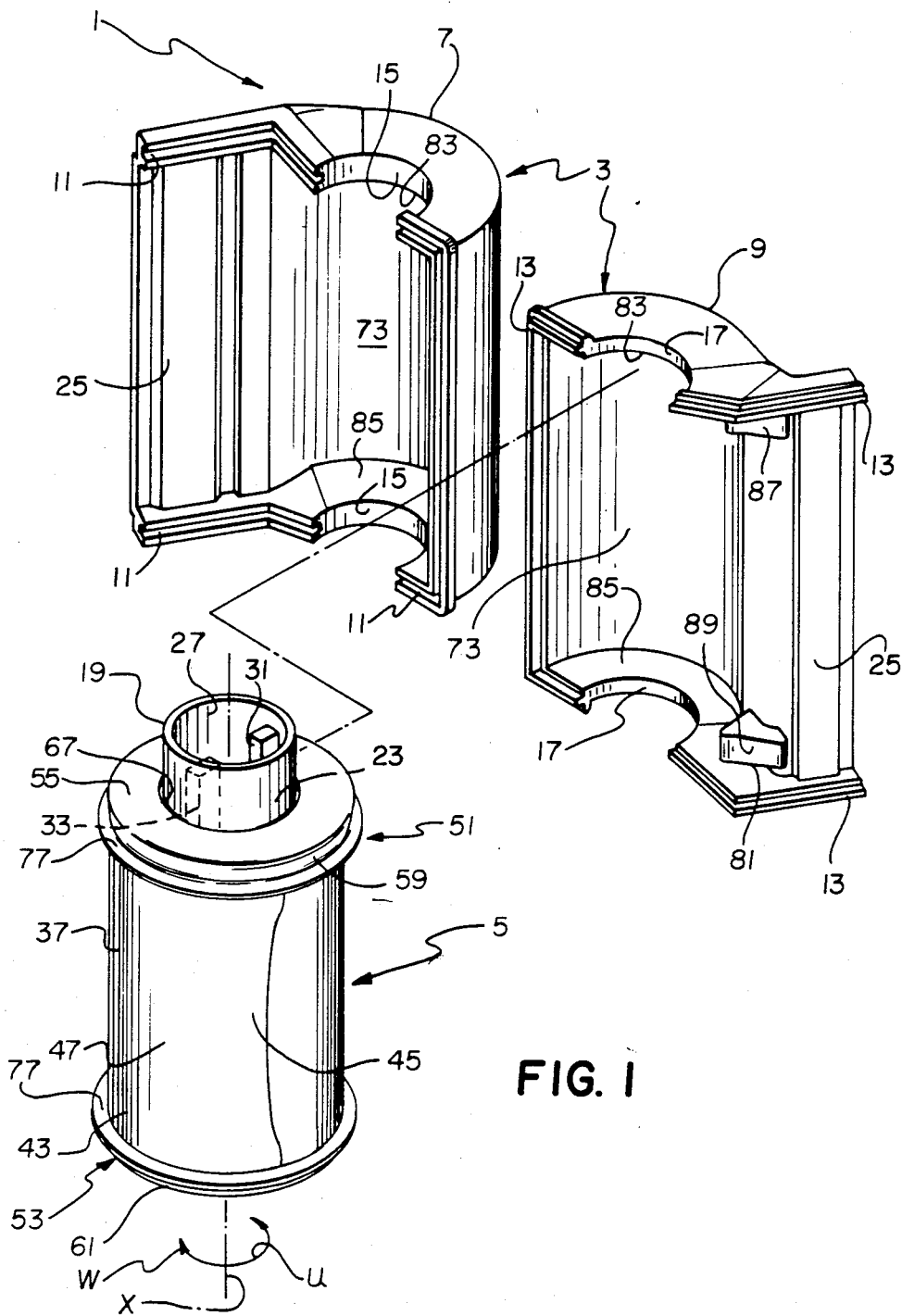
FIG. 1 is an exploded perspective view of a film cassette similar to the one disclosed in the cross-referenced application.
Figure 2:
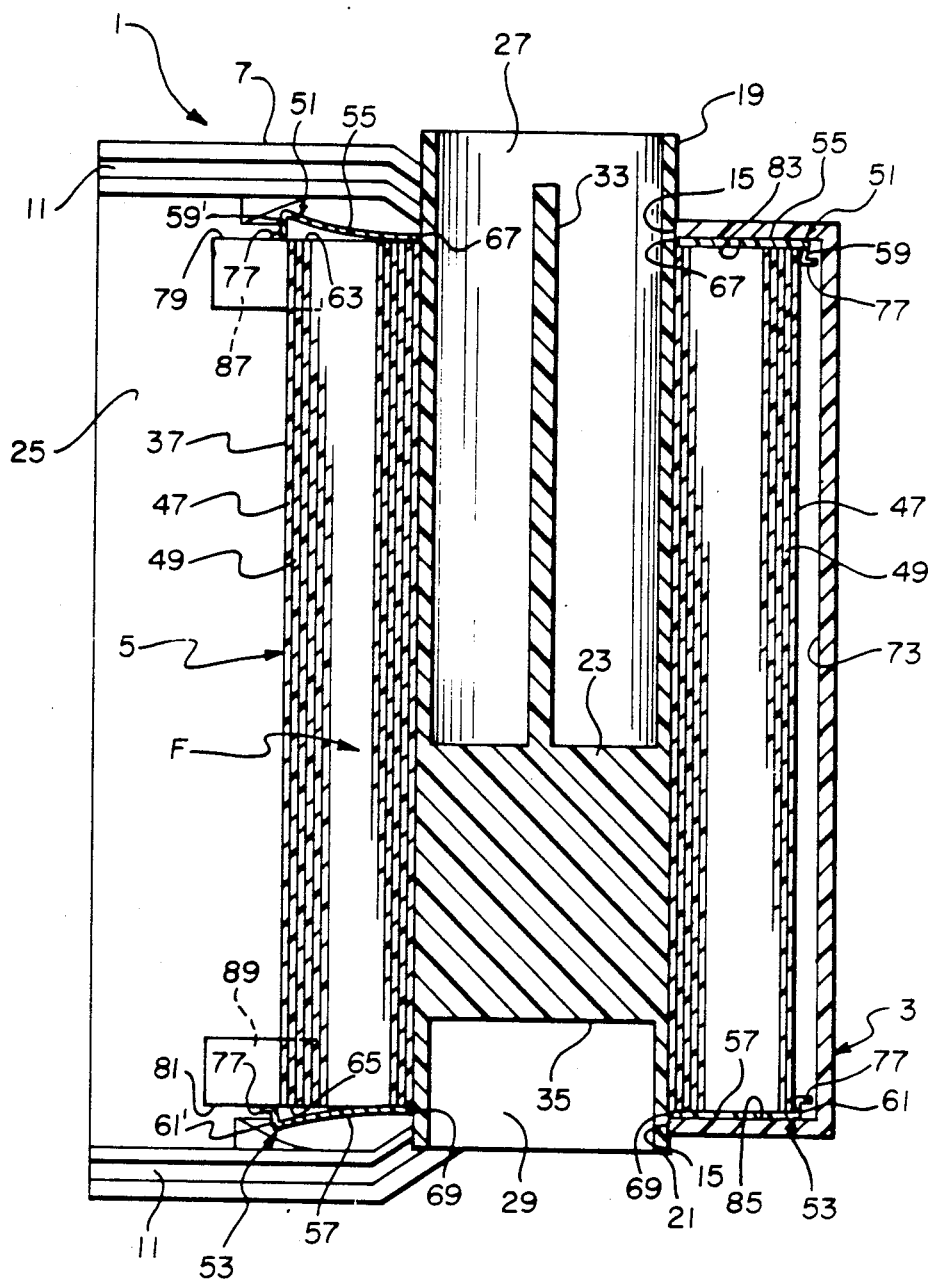
FIG. 2 is an elevation view in cross-section of the film cassette.
Figure 3:
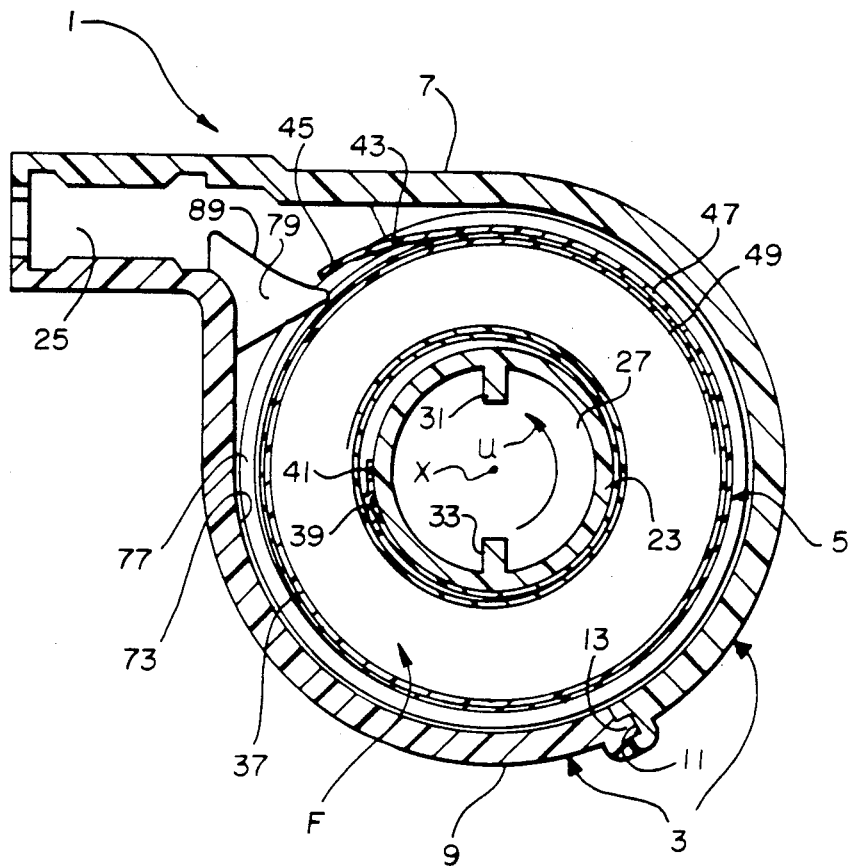
FIG. 3 is an end view in cross-section of the film cassette.

Referring now to the drawings, FIGS. 1-3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a rewinding direction indicated by the arrow W in the same FIG.

A roll 37 of convoluted 35 mm film, i.e. a filmstrip F, is wound about the spool core 23. As indicated in FIG. 3, the film roll 37 has an inner or trailing end 39 attached to the spool core 23 by a suitable piece of adhesive tape 41 and a film leader 43. The film leader 43 has leading or forward end 45 and comprises 2-3 convolutions of the film roll 37. One of these leader convolutions is the outermost convolution 47 and another of them is the next inward succeeding convolution 49.

Figure 4:
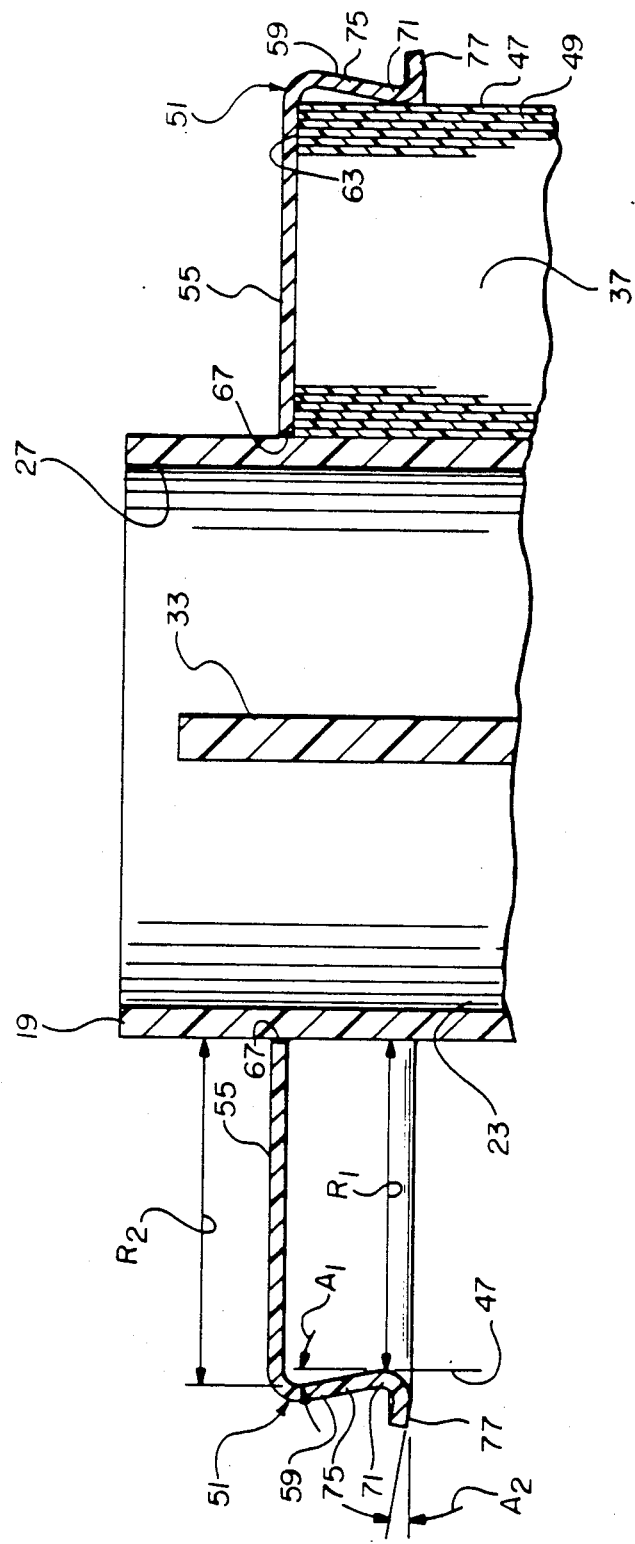
FIG. 4 is an elevation view in cross-section of a film spool and an annular constraining flange included within the film cassette.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45′, for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59' and 61' of the annular lips 59 and 61 axially away from each other to an axial dimension slightly exceeding the film width. See FIG. 2. In essence, the deflected portions 59' and 61' of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59' and 61' of the annular lips 59 and 61 axially away from each other as the respective portions are rotated past the spreader surfaces. The deflected portions 59' and 61' of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction W, the filmstrip F will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

The Camera Apparatus

Figure 5:
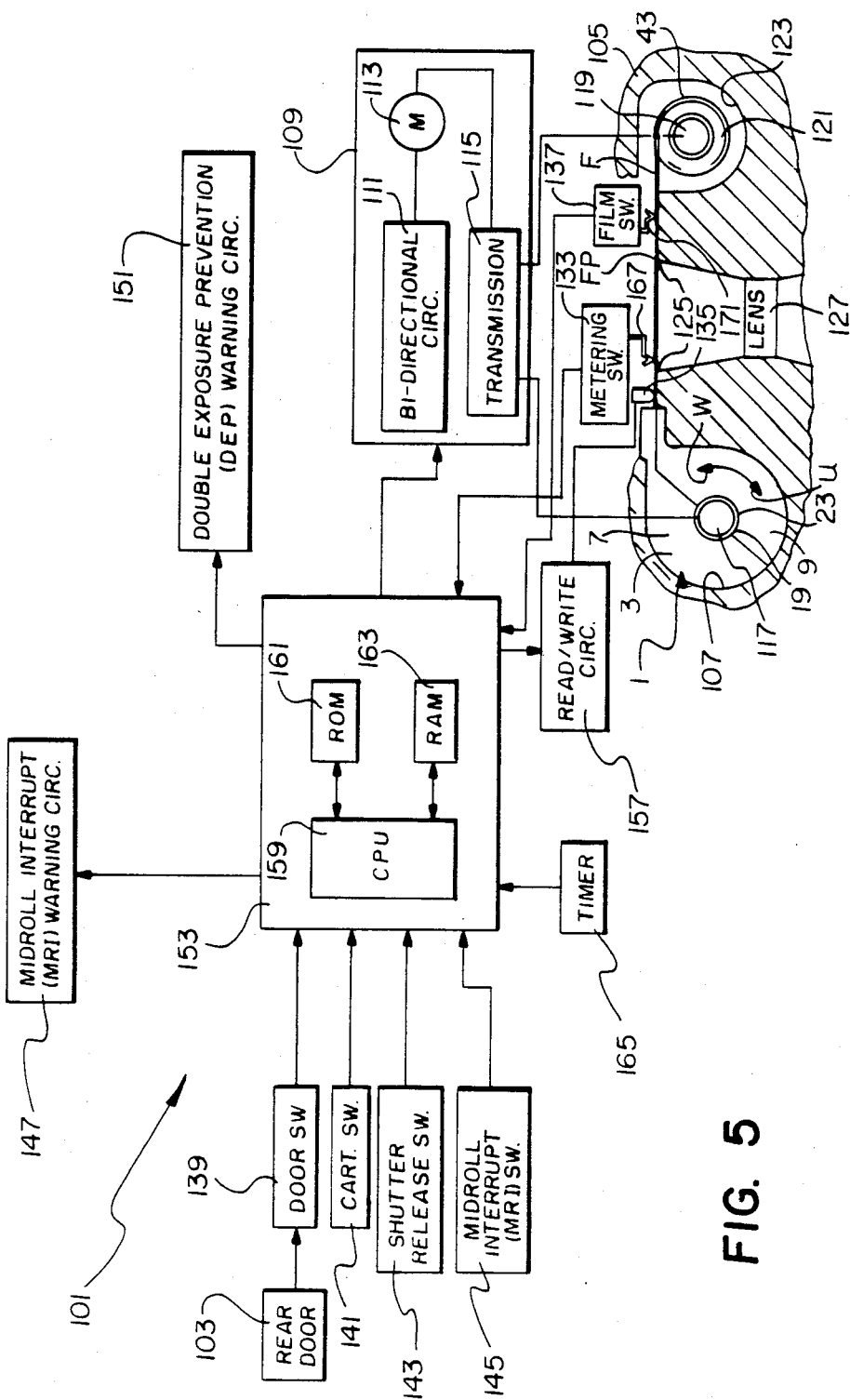
FIG. 5 is a schematic view of camera apparatus for preventing double exposure of the filmstrip stored in the film cassette, according to a preferred embodiment of the invention.

Referring now to FIG. 5, camera apparatus 101 is depicted for use with the type of film cassette 1 having a normally non-protruding film leader 43. Briefly, the camera apparatus 101 is intended to magnetically apply successive double exposure prevention (DEP) encodements to the filmstrip F to indicate respective film frames are exposed, and to read the last DEP encodement to prevent re-exposure of the exposed frames when a partially exposed film roll is loaded in the camera apparatus.

As shown in FIG. 5, the camera apparatus 101 includes a rear or bottom door 103 pivotally mounted on the camera body 105 for opening to permit insertion of the film cassette 1 laterally or axially (endwise) into a loading chamber 107. Conventional motorized film transport means 109 comprises a bi-directional circuit 111, a reversible drive motor 113 controlled by the circuit, a suitable drive transmission 115, and respective drive hubs 117 and 119. The drive hubs 117 and 119 engage the spool core 23 of the film cassette 1 and a take-up spool or drum 121, rotatably supported within a take-up chamber 123, to rotate the spool core and the take-up drum either in the unwinding direction U or in the winding direction W.

When fresh unused (unexposed) film is loaded in the camera apparatus 101, the film transport means 109 is operated in a prewind mode initially to rotate the spool core 23 in the unwinding direction U to propel the non-protruding film leader 43 out of the cassette shell 3, across a back frame opening 125 situated at the focal plane FP of a taking (objective) lens 127, and onto the take-up drum 121. At the same time, the drum 121 is rotated in the same direction U to permit a tooth, not shown, located on its periphery, to engage the film leader 43 at a hole, not shown, cut in the leading end 45 of the film leader. Following this, substantially the entire remainder of the filmstrip F is pre-wound without interruption from the cassette shell 3 across the back frame opening 125 and onto the drum 121. The film movement occurs without exposing the filmstrip F. Since a trailing end 39 of the filmstrip F is attached to the spool core 23, an end-of-film condition will be reached which causes the motor 113 to stall, whereupon as is customary the bi-directional circuit 111 reverses the motor to operate the film transport means 109 in a rewind mode, opposite to the prewind mode. During the rewind mode, the spool core 23 is rotated in the winding direction W and the drum 121 is rotated similarly. However, the film transport means 109 is de-energized once a first-available film frame #1 in FIG. 6, i.e. a first-available imaging area of the filmstrip F, is moved to an exposure position at the back frame opening 125. Then, after the first picture is taken, the film transport means 109 is operated in the rewind mode to wind the first exposed frame onto the spool core 23 and to move the next-available unexposed frame #2 in FIG. 6 to the exposure position. This process is repeated following each film exposure, and the filmstrip F will thereby be rewound one frame at a time into the cassette shell 3. Thus, the exposed frames will be protected inside the cassette shell 3 if, for example, the rear door 103 is accidentally opened before the filmstrip F is completely returned to the film cassette 1.

Other elements of the camera apparatus 101 include a normally closed metering switch 133, a conventional magnetic read/write head 135, a normally open film sensing switch 137, a normally open door switch 139, a normally open cartridge switch 141, a normally open shutter release switch 143, a normally open midroll interrupt (MRI) switch 145, and respective conventional midroll interrupt (MRI) and double exposure prevention (DEP) warning circuits 147 and 151. Each of the elements 133, 135, 137, 139, 141, 143, 145, 147, and 151, as well as the film transport means 109, is connected individually to a conventional digital microcomputer 153 such as used in many recent cameras. As shown in FIG. 5, the read/write head 135 is connected to the microcomputer via a conventional read/write circuit 157. Various other encoding and decoding circuits are disclosed in cross-referenced application Ser. Nos. 206,646, 206,408, 206,553, and 206,407. The microcomputer 153 as is customary includes a central processing unit (CPU) 159, a random access memory (RAM) 161, a read-only memory (ROM) 163, and an external timer 165.

Figure 6:
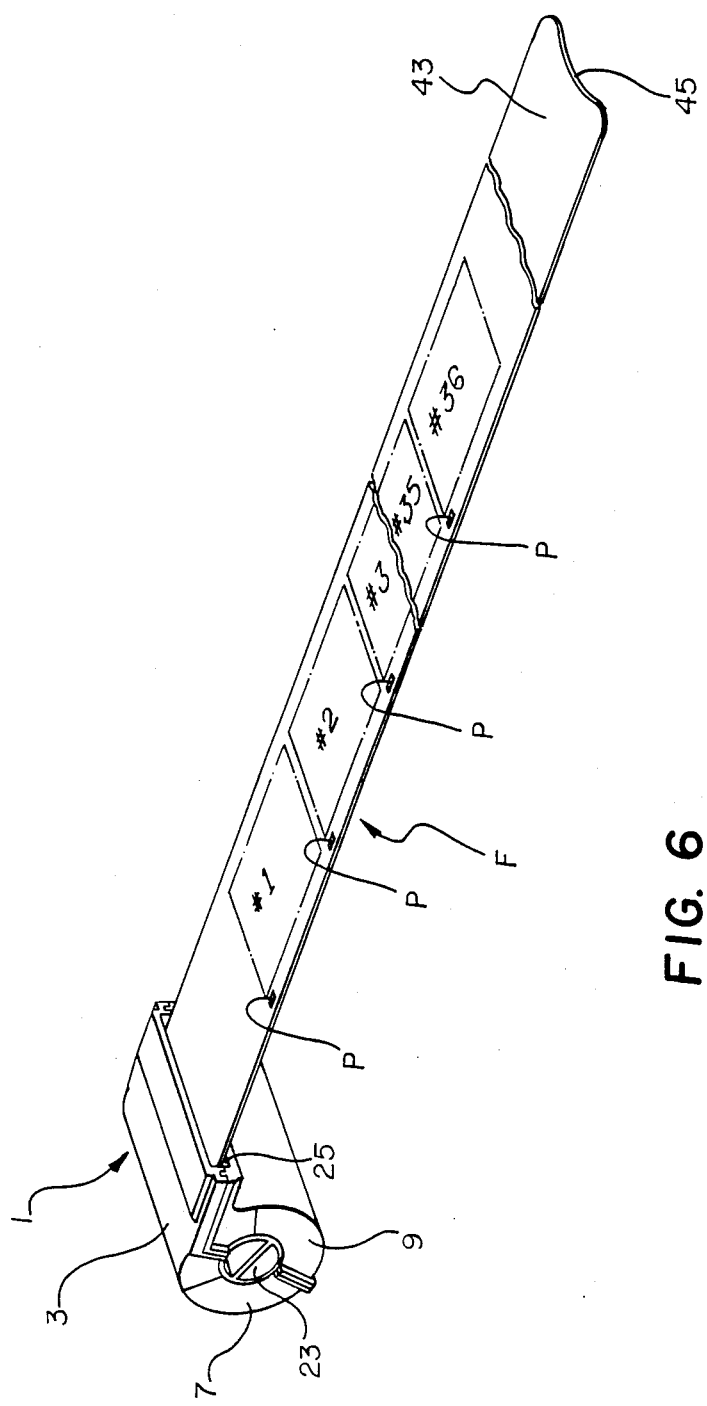
FIG. 6 is a perspective view of the film cassette depicted with substantially the entire length of the filmstrip extending from the cassette shell.
Figure 7:
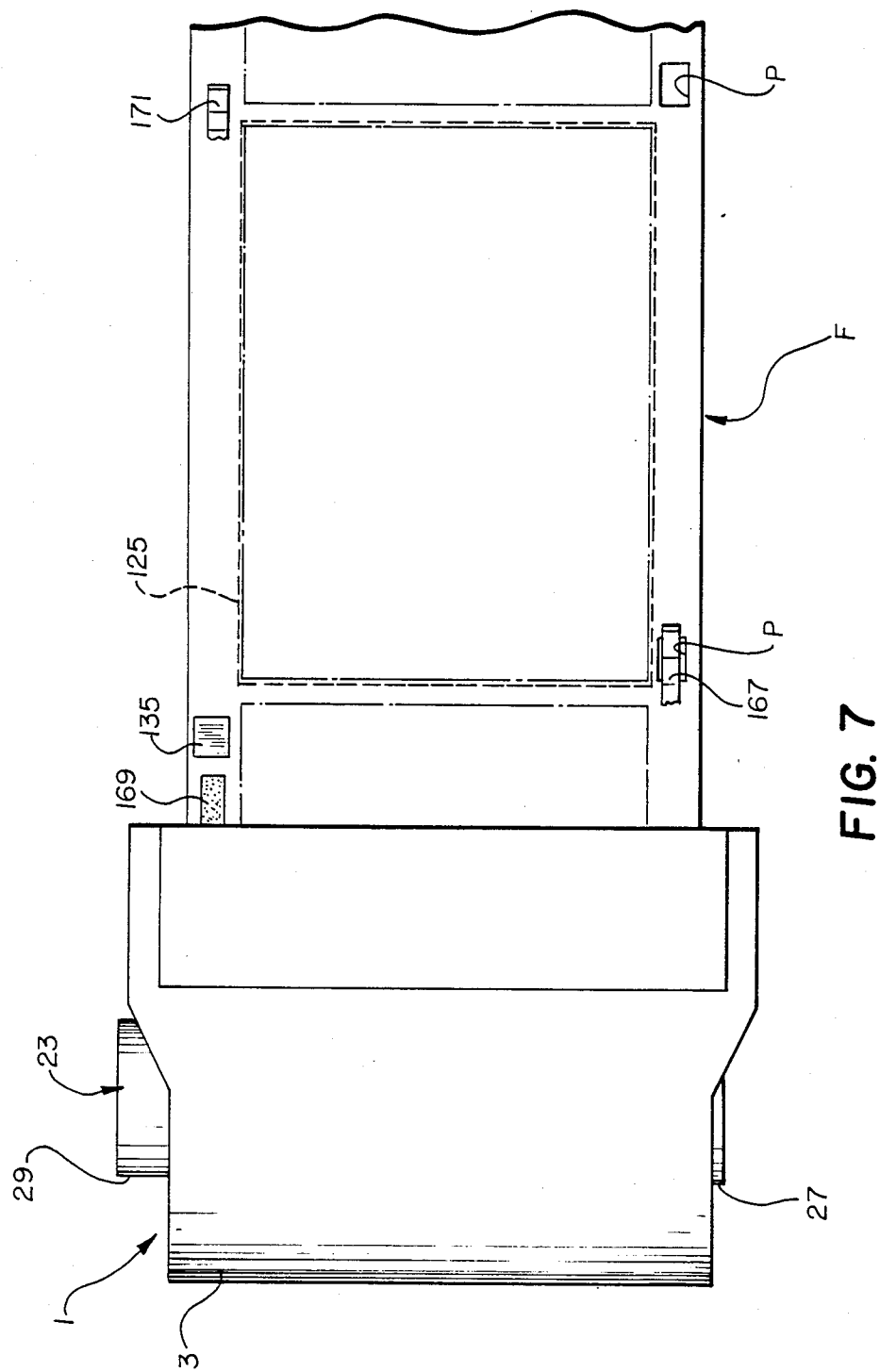
FIG. 7 is a plan view of the film cassette and the filmstrip.

The metering switch 133 is closed each time a perforation sensor 167 of the switch drops into one of a series of evenly spaced film perforations P in the filmstrip F. As shown in FIG. 6, the filmstrip F has a single perforation P between each two adjacent film frames #1-#36. No perforations, however, are in the film leader 43. When the metering switch 133 is closed it indicates the filmstrip F has been moved slightly more than a single frame width. As shown in FIG. 7, the perforation sensor 167 is located adjacent one corner of the back frame opening 125. Thus, closure of the metering switch 133 will occur whenever one of the film frames #1-#36 is in the exposure position at the back frame opening 125.

The read/write head 135 is adapted to magnetically write identical double exposure prevention (DEP) encodements 169, one of which is shown in FIG. 7, along the filmstrip F adjacent each exposed film frame to indicate a film frame is exposed, and it is adapted to magnetically sense the presence or absence of a DEP encodement for a film frame to determine whether that particular frame is exposed. The DEP encodement 169 is written on the filmstrip F every time an exposed film frame is moved from its exposure position at the back frame opening 125 and into the film cassette 1 (during the rewind mode of the film transport means 109), and conversely it would be read whenever an exposed film frame is advanced from the film cassette (during the prewind mode of the film transport means). As shown in FIGS. 5 and 7, the read/write head 135 is located between the loading chamber 107 for the film cassette 1 and the back frame opening 125. The filmstrip F may be provided with a known magnetic stripe or a known transparent magnetic overlay, not shown, on which each DEP encodement 169 is to be written. A suitable support for the read/write head 135 may be located on the rear door 103 and is disclosed in cross-referenced application Ser. No.

The door switch 139 is closed when the rear door 103 is closed and is opened when the rear door is opened. The cartridge switch 141 is closed whenever the film cassette 1 is present in the loading chamber 107 and is open whenever the chamber is empty. The shutter release switch 143 is closed each time a conventional shutter, not shown, is opened and is open whenever the shutter is closed. The midroll interrupt (MRI) switch 145 is closed when an MRI button, not shown, on the camera body 105 is manually depressed to initiate rewind of the filmstrip F into the film cassette 1 prematurely, i.e. before all of the available film frames have been exposed. The film sensing switch 137 is closed when a film sensor 171 of the switch contacts the filmstrip F and is opened whenever the film sensor is out of contact with the filmstrip. As shown in FIGS. 5 and 7, the film sensing switch 137 is located between the back frame opening 125 and the take-up drum 121.

Figure 8A:
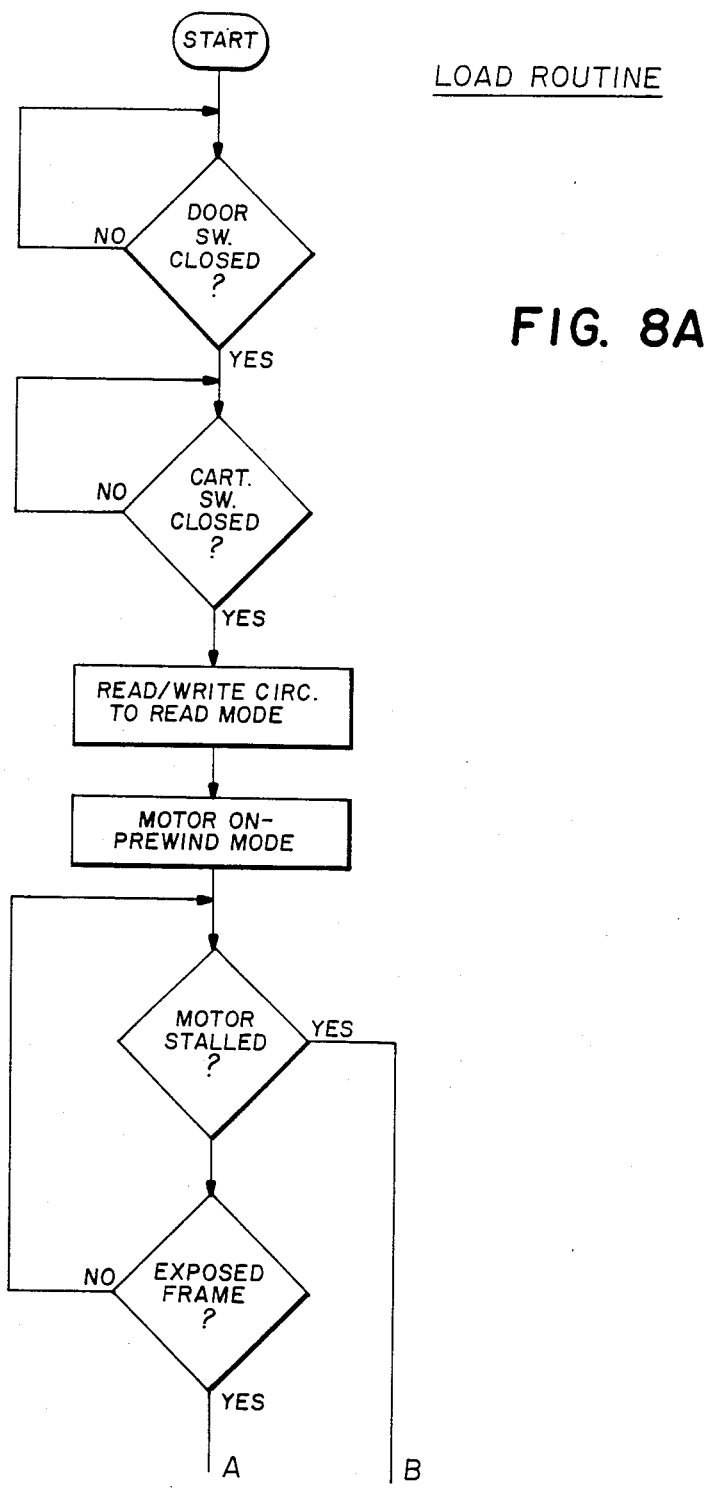
FIGS. 8A and 8B are a flow chart illustrating a load/double exposure prevention (DEP) routine of the camera apparatus.
Figure 8B:
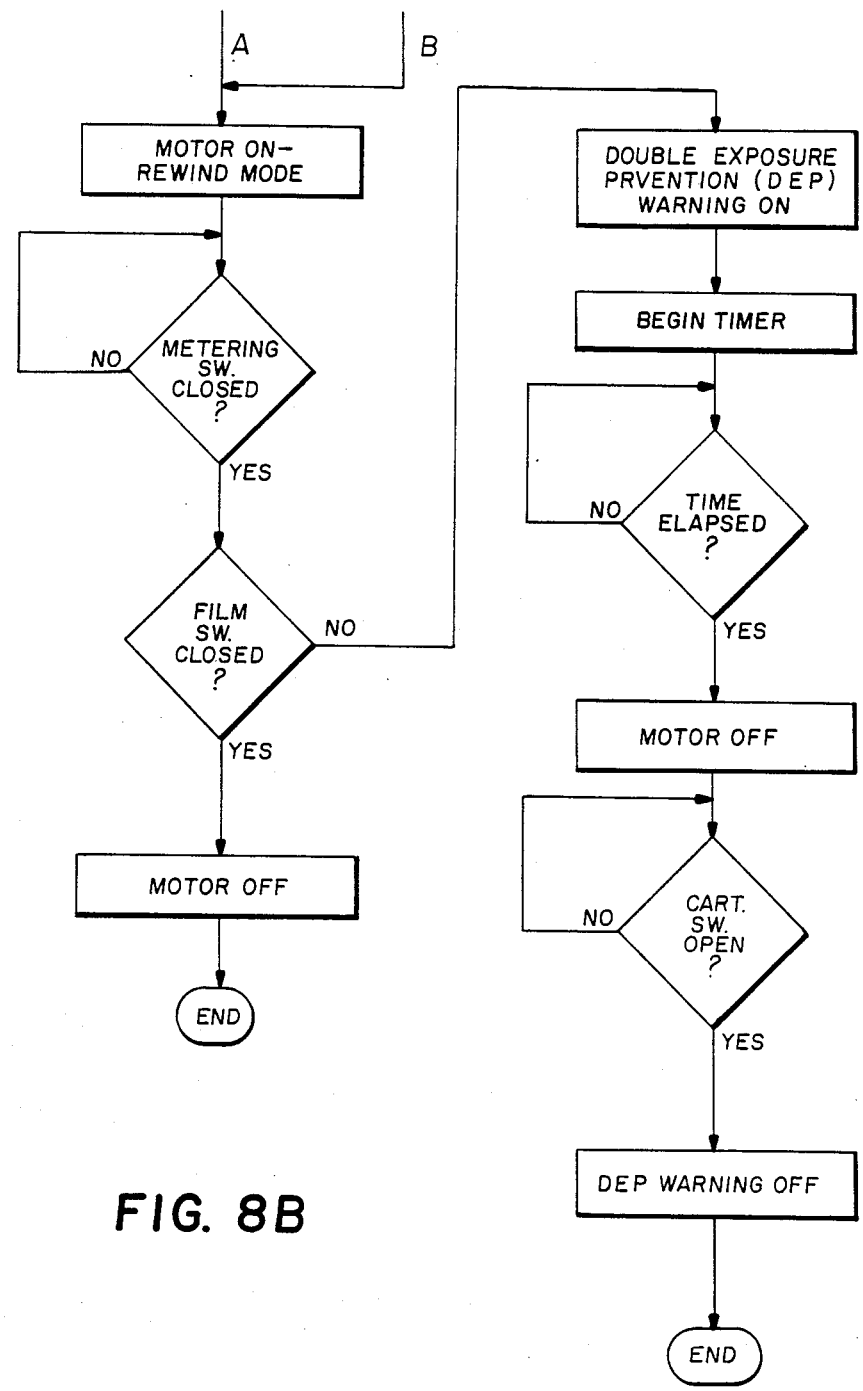
Figure 9:
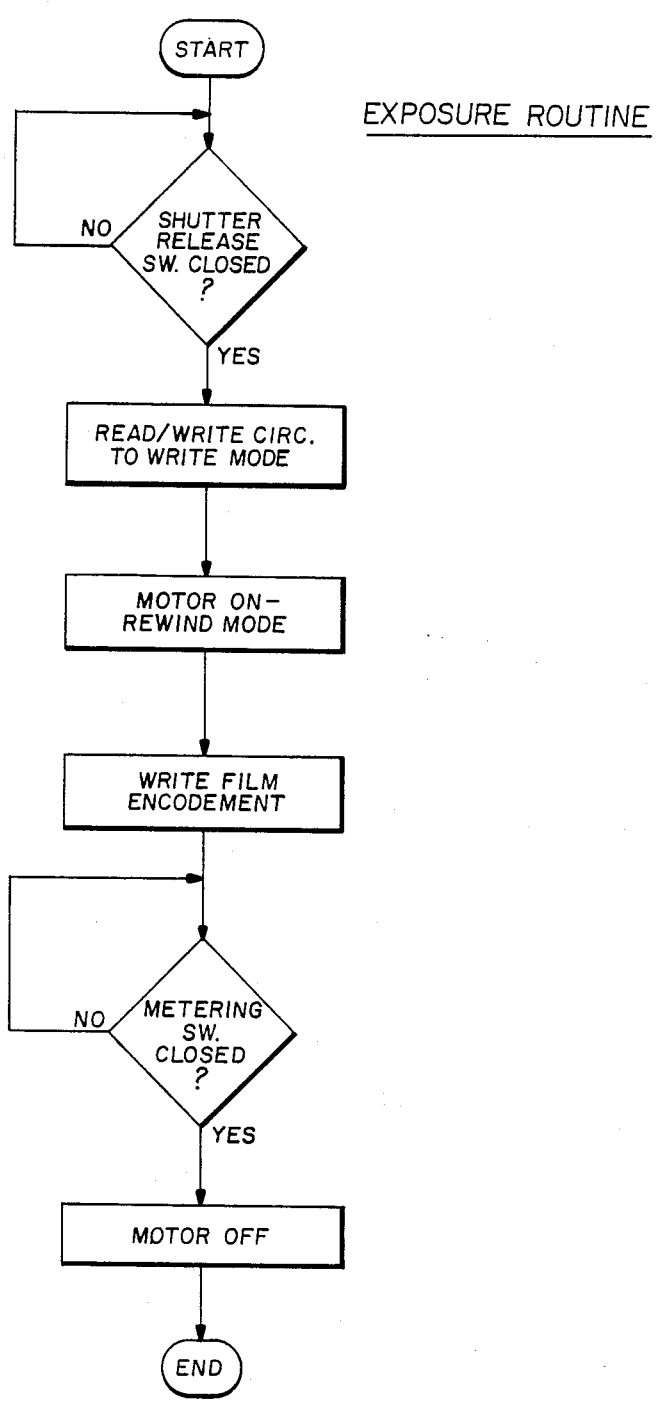
FIG. 9 is a flow chart illustrating an exposure routine of the camera apparatus.
Figure 10:
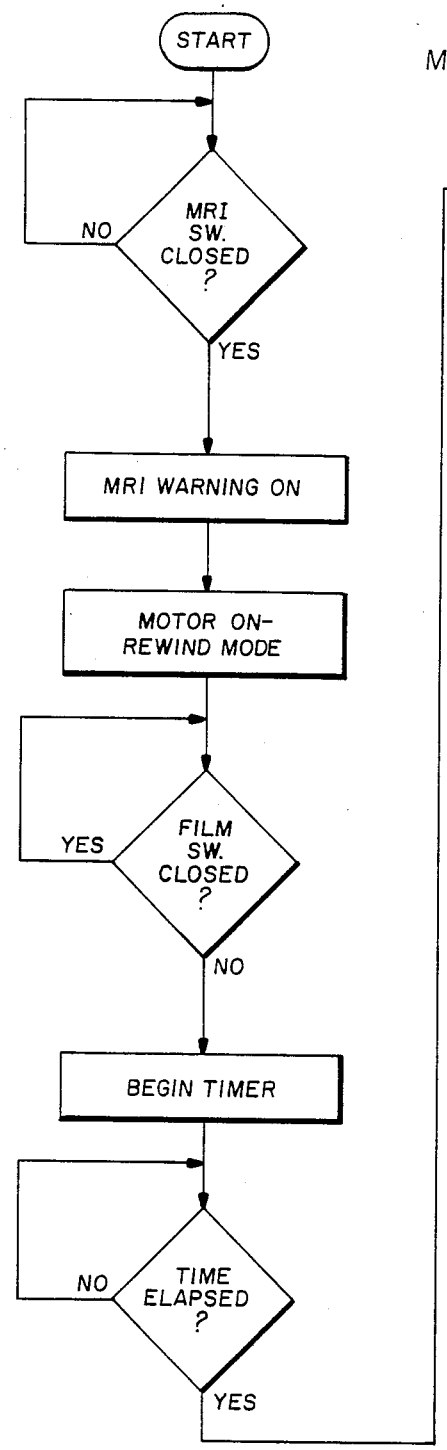
FIG. 10 is a flow chart illustrating a midroll interrupt (MRI) routine of the camera apparatus.
Figure 10:
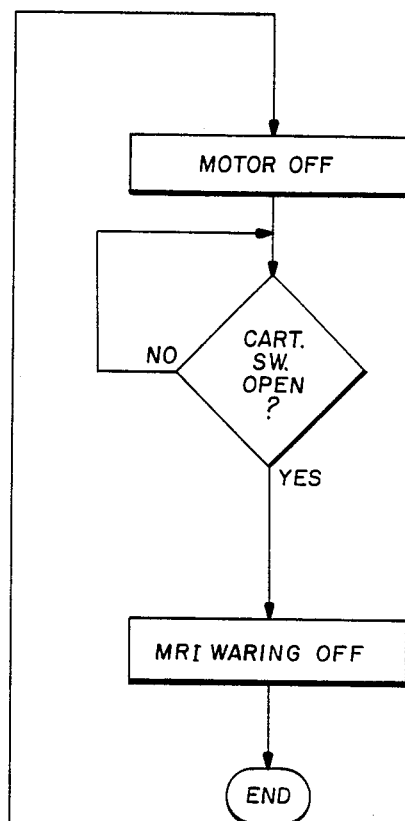

Flow Charts FIGS. 8–10

FIGS. 8, 9, and 10 are respective flow charts which depict three explicit routines or modes of the microcomputer 153 which are effected in cooperation with the switches 133, 137, 139, 141, 143 and 145, with the film transport means 109, with the read/write head 135, and with the midroll interrupt (MRI) and double-exposure prevention (DEP) warning circuits 147 and 151.

(1) Load/Double Exposure Prevention (DEP) Routine—FIG. 8

If in this routine the door switch 139 is closed because the rear door 103 is closed, and the cartridge switch 141 is closed because the film cassette 1 is loaded in the loading chamber 107, the read/write circuit 157 will assume the read mode to enable the magnetic head 135 to determine the presence or absence of a DEP encodement 169 on the filmstrip F, and the film transport means 109 will be operated in the prewind mode to energize the motor 113 to rotate the spool core 23 of the film cassette in the unwinding direction U and to rotate the take-up drum 121 in the same direction in order to advance the filmstrip F from the film cassette onto the take-up drum without exposing any of the film frames.

If the filmstrip F is completely unexposed, i.e. it is fresh unused film, substantially the entire length of the filmstrip will be wound onto the take-up drum 121 and the resulting end-of-film condition will stall the motor 113, thereby causing the film transport means 109 to be operated in the rewind mode instead of the prewind mode. Consequently, the motor 113 will be reversed to rotate the spool core 23 in the winding direction W and to rotate the take-up drum 121 in the same direction until the metering switch 133 is closed. Then, the motor 113 will be de-energized. At this time, the first-available unexposed frame #1 in FIG. 6 will be in the exposure position at the back frame opening 125.

If the filmstrip F is partially exposed because it was removed from the camera apparatus 101 before all of the available film frames #1-#36 in FIG. 6 were exposed, and now it has been re-loaded into the camera apparatus, the read/write head 135 will read the first DEP encodement 169 that emerges from the film cassette 1. Then, the film transport means 109 will be changed from its prewind mode to its rewind mode and the motor 113 will be reversed to return the corresponding last-exposed film frame to the film cassette. See FIG. 7. When the metering switch 133 is closed because the next-available unexposed frame has been moved to the exposure position at the back frame opening 125, the motor 113 will be de-energized.

If the filmstrip F is completely exposed, the read/write head 135 will read a DEP encodement 169 adjacent film frame #36 in FIG. 6 because that particular frame was the last one to be exposed during previous use and is the first one to be advanced from the film cassette 1 at this time. Then, the film transport means 109 will be changed from its prewind mode to its rewind mode and the motor will be reversed to return the last-exposed frame, film frame #36, to the film cassette. Since the film leader 43 does not include any of the perforations P in the filmstrip F, the metering switch 133 will not be closed until the leading end 45 of the film leader is rewound past the perforation sensor 167 of the metering switch. Then, because the film presence sensing switch 137 is open (due to the fact that the leading end 45 of the film leader 43 was previously rewound past the film sensor 171 of that switch), the DEP warning circuit 151 will be activated to alert the user that the filmstrip F is completely exposed. Simultaneously the timer 165 will be activated. When the timer 165 determines that a sufficient time, e.g. one-half second, has elapsed to rewind the film leader 43 into the film cassette 1, the motor 113 will be de-energized. Since the DEP warning circuit 151 remains activated, the user is reminded to remove the film cassette 1 from the loading chamber 107, whereupon the circuit will be de-activated.

(2) Expose Routine—FIG. 9

If in this routine the shutter release switch 143 is closed because the camera shutter is opened, the read/write circuit 157 will assume the write mode, and the film transport means 109 will be operated in its rewind mode to energize the motor 113 to rewind the exposed frame into the film cassette 1 and to move the next-available unexposed frame to the exposure position at the back frame opening 125. As the exposed frame is moved out of the exposure position, the read/write head 135 will write a DEP encodement 169 on the filmstrip F at a predetermined location adjacent the exposed frame, to indicate that particular frame is exposed. When the metering switch 133 is closed because the next-available unexposed frame has been moved to the exposure position, the motor 113 will be de-energized.

(3) Midroll Interrupt (MRI) Routine—FIG. 10

If in this routine the MRI switch 145 is closed because the user has manually depressed the MRI button, the MRI warning circuit 147 will be activated to alert the user of such condition, and the film transport means 109 will be operated in its rewind mode to energize the motor 113 to rewind all of the filmstrip F remaining outside the film cassette 1 into the cassette. Then, after the timer 165 has timed-out as in the load routine of FIG. 8, the motor 113 will be de-energized. Since the MRI circuit 147 remains activated, the user is reminded to remove the film cassette 1 from the loading chamber 107, whereupon the circuit will be de-activated.

Operation

The film transport means 109 is operated in its prewind mode to continuously advance the unexposed film frames #1–#36 of the filmstrip F from the film cassette 1 to the take-up drum 121, without exposing any of the film frames at the focal plane FP of the taking lens 127, and is operated in its rewind mode to position respective unexposed frames for exposure at the focal plane and to return them individually to the film cassette following each exposure. Before an exposed film frame is returned to the film cassette 1, a DEP encodement 169 is applied to the filmstrip F at a predetermined location proximate the exposed frame. If the filmstrip F is rewound into the film cassette 1 prematurely, i.e. without it being completely exposed, and at a later time the film cassette is re-loaded into the camera apparatus 101, the film transport means 109 will be operated in the prewind mode only until a DEP encodement 169 is sensed. Then, the film transport means 109 will be operated in the rewind mode to return the exposed frame corresponding to the sensed encodement to the film cassette and to position the next-available unexposed frame for exposure at the focal plane FP.

The invention has been described with reference to a preferred embodiment. However, it will be appreciated that variations and modifications can be effected with the ordinary skill in the art without departing from the scope of the invention. For example, the leading end 45 of the film leader 43, instead of initially being located as shown in FIG. 3, could be located in the film passate slit 25 of the film cassette 1 or could very slightly protrude from the cassette. Thus, the term "non-protruding" as it refers to the film leader 43 in this application is meant to include "essentially non-protruding".

According to another example, the filmstrip F might include conventional film-related data, such as film speed, which is originally magnetically applied to the filmstrip by the film manufacturer. Then, the DEP encodement 169 would be applied to the exact location occupied by all or part of the original data to thereby replace all or part of such data. Alternatively, all or part of the original data could simply be erased to leave a void which, in effect, would serve as the DEP encodement 169.

I claim:

1. An improved photographic camera wherein a motorized film transport is operated in a prewind mode to continuously advance successive unexposed frames of a filmstrip from a light-tight cassette across a focal plane of an objective lens to a film take-up, without exposing the film frames at said focal plane, and is operated in a rewind mode to position respective unexposed frames for exposure at the focal plane and to return them individually to the cassette following each exposure, and wherein the improvement comprises:

read/write means responsive to exposure of respective film frames at said focal plane for providing corresponding film encodements along the filmstrip to indicate each film frame is exposed, and for sensing the presence or absence of a film encodement for a film frame to determine whether that particular frame is exposed; and control means responsive to said read/write means sensing the absence of a film encodement for a film frame for allowing said film transport to continue to operate in the prewind mode, and responsive to the read/write means sensing the presence of a film encodement for a film frame for operating the film transport in the rewind mode to return only that particular frame to the cassette, whereby when a cassette containing a filmstrip which is partially exposed is loaded in said camera said control means will operate said film transport to position the next-available unexposed frame of the filmstrip for exposure at said focal plane.

2. The improvement as recited in claim 1, wherein the filmstrip originally includes alterable film-related data opposite each film frame, and said read/write means alters the data to provide a film encodement.

3. The improvement as recited in claim 1, wherein said camera includes a cassette-receiving chamber and said read/write means includes a read/write element for writing and reading a film encodement at a predetermined location between said chamber and said focal plane of the objective lens, to enable respective film frames to be encoded following each exposure and to enable the film encodement to be sensed substantially immediately after it emerges from the film cassette.

* * * * *